US012643448B2

(12) United States Patent
Loerch et al.

(10) Patent No.: US 12,643,448 B2
(45) Date of Patent: Jun. 2, 2026

(54) SYSTEM, APPARATUS, AND/ OR METHOD FOR PROVIDING A HEADREST WITH ONE OR MORE LOUDSPEAKERS FOR IMPROVED AUDIO PERFORMANCE

(71) Applicant: Harman Becker Automotive Systems GmbH, Karlsbad (DE)

(72) Inventors: Dominik Loerch, Karlsbad (DE); Matthias Von Saint-George, Pfinztal (DE); Austin Mitchell, Ann Arbor, MI (US); Matthew Christopher Marrocco, Lapeer, MI (US); David Mossington, Rochester, MI (US); Hans-Juergen Regl, Bogen (DE); Juergen Wagener, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 133 days.

(21) Appl. No.: 18/778,117

(22) Filed: Jul. 19, 2024

(65) Prior Publication Data

US 2026/0021757 A1    Jan. 22, 2026

(51) Int. Cl.
*B60N 2/879* (2018.01)
*H04R 1/02* (2006.01)

(52) U.S. Cl.
CPC ............. *B60N 2/879* (2018.02); *H04R 1/023* (2013.01); *H04R 2499/13* (2013.01)

(58) Field of Classification Search
CPC ..... B60N 2/879; H04R 1/023; H04R 2499/13
See application file for complete search history.

(56) References Cited

U.S. PATENT DOCUMENTS

| | | | | |
|---|---|---|---|---|
| 9,327,628 B2 * | 5/2016 | Subat | .................... | B60N 2/879 |
| 9,820,033 B2 * | 11/2017 | Dix | ....................... | H04R 1/2826 |
| 10,362,385 B1 * | 7/2019 | Di Censo | ................. | H04R 5/02 |
| 11,082,759 B2 * | 8/2021 | Hentschel | .............. | H04R 1/023 |
| 11,110,839 B2 * | 9/2021 | Subat | ........................ | H04R 1/02 |
| 11,336,994 B2 * | 5/2022 | Corynen | ................ | H04R 5/023 |
| 11,535,136 B2 * | 12/2022 | Groleau | ................. | H04R 5/023 |

(Continued)

FOREIGN PATENT DOCUMENTS

| | | |
|---|---|---|
| DE | 112019002208 T5 | 1/2021 |
| JP | 2023172873 A | 12/2023 |

OTHER PUBLICATIONS

Extended European Search Report for Application No. 25189601.5, dated Jan. 9, 2026, 7 pages.

*Primary Examiner* — Philip F Gabler
(74) *Attorney, Agent, or Firm* — Brooks Kushman P.C.

(57) ABSTRACT

A seat assembly is provided. The seatback for a first seat is configured to receive an occupant in a vehicle. A headrest is coupled to the seatback and includes at least one loudspeaker and a lattice structure. At least one loudspeaker is positioned in the headrest and is configured to transmit an audio output signal from the headrest. The lattice structure includes a first section positioned proximate to the at least one loudspeaker to enable the audio output signal to pass therethrough and a second section to prevent the audio output signal from leaking to a second seat. The first section is formed at a first density and the second section is formed at a second density. The first density of the first section is less than the second density of the second section to increase an acoustic transparency of the audio output signal.

20 Claims, 4 Drawing Sheets

(56)  References Cited

U.S. PATENT DOCUMENTS

| 12,043,154 | B2 * | 7/2024 | Dillinger | .............. | H04R 1/1083 |
| 2014/0355783 | A1 | 12/2014 | Subat | | |
| 2015/0201260 | A1 * | 7/2015 | Oswald | .................. | B60N 2/809 |
| | | | | | 381/86 |

* cited by examiner

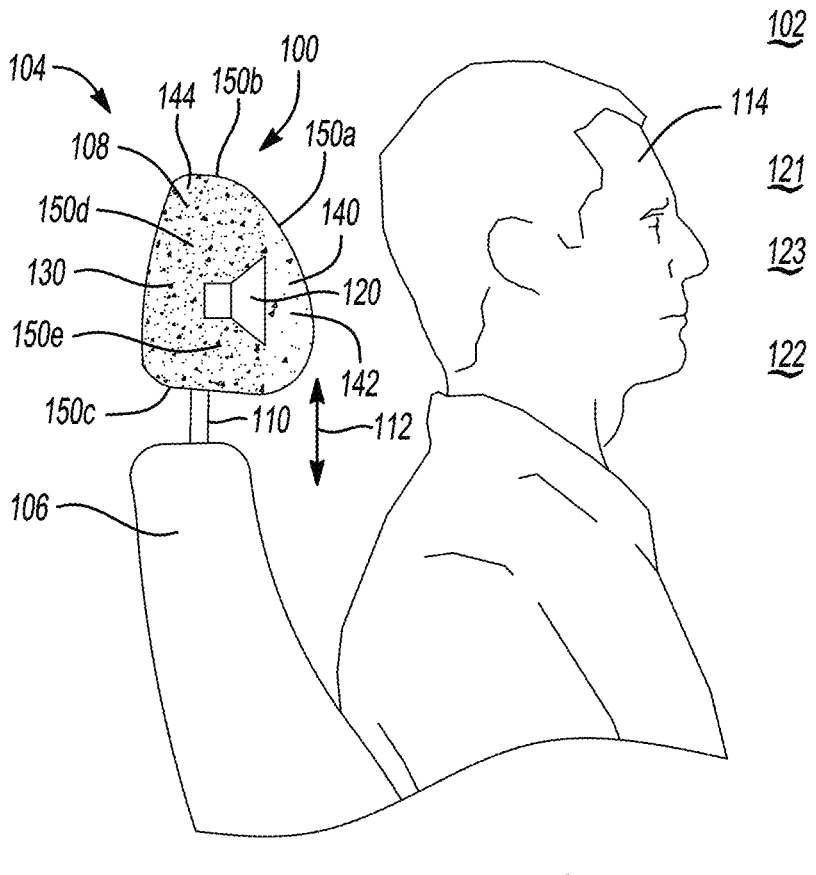
_Fig-1_
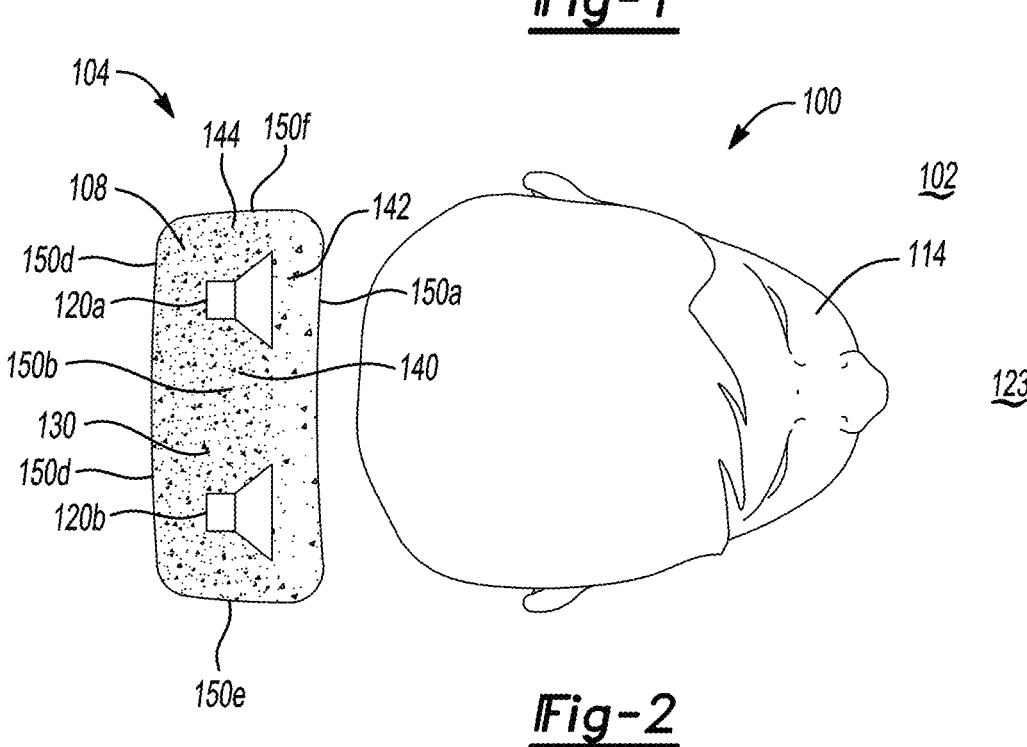
_Fig-2_

SYSTEM, APPARATUS, AND/ OR METHOD FOR PROVIDING A HEADREST WITH ONE OR MORE LOUDSPEAKERS FOR IMPROVED AUDIO PERFORMANCE

TECHNICAL FIELD

Aspects disclosed herein generally relate to a system, apparatus and/or method for providing, for example, a vehicle headrest with one or more loudspeakers for improved audio performance. These aspects and others will be discussed in more detail herein.

BACKGROUND

A conventional headrest may include a substructure or core that is packaged with one or more loudspeakers and perforated foam. The perforated foam may provide comfort for an occupant's head. The perforated foam may be optimized to provide varying degrees of comfort. However, the presence of such foam may adversely affect the overall audio quality and hence audio performance suffers for the occupant. For example, audio related issues such as loss inefficiency and early roll-off frequency may lead to customer dissatisfaction for vehicle Original Equipment Manufacturers (OEMs).

SUMMARY

In at least one embodiment, a seat assembly is provided. The seatback for a first seat is configured to receive an occupant in a vehicle. A headrest is coupled to the seatback and includes at least one loudspeaker and a lattice structure. At least one loudspeaker is positioned in the headrest and is configured to transmit an audio output signal from the headrest. The lattice structure includes a first section positioned proximate to the at least one loudspeaker to enable the audio output signal to pass therethrough and a second section to prevent the audio output signal from leaking to a second seat. The first section is formed at a first density and the second section is formed at a second density. The first density of the first section is less than the second density of the second section to increase an acoustic transparency of the audio output signal.

In at least one embodiment, a seat assembly is provided. The seat assembly includes a first seat having a seatback and a headrest. The seatback is configured to receive an occupant in a vehicle. The headrest is coupled to the seatback. The headrest includes at least one loudspeaker and a lattice structure. The at least one loudspeaker is positioned therein and is configured to transmit an audio output signal from the headrest into a listening environment. The lattice structure includes a first section positioned proximate to the at least one loudspeaker to enable the audio output signal to pass therethrough and a second section being proximate to the first section to prevent the audio output signal from leaking from the first seat to a second seat. The first section of the lattice structure defines a first plurality of openings and the second section of the lattice structure defines a second plurality of openings. The first plurality of openings is larger than the second plurality of openings to increase an acoustic transparency of the audio output signal as the audio output signal is transmitted through the first section of the lattice structure.

In at least one embodiment, an apparatus is provided. The apparatus includes a headrest for being coupled to a first seat to receive an occupant in a vehicle. The headrest including at least one loudspeaker and a lattice structure. The at least one loudspeaker is configured to transmit an audio output signal from the headrest into a listening environment. The lattice structure includes a first section positioned on a first side of the headrest that is orientated toward a front of the vehicle to enable the audio output signal to pass therethrough and a second section being positioned proximate to the first section to prevent the audio output signal from leaking to a second seat. The first section of the lattice structure is formed at a first density and the second section of the lattice structure is formed at a second density. The first density of the first section is less than the second density of the second section to increase an acoustic transparency of the audio output signal as the audio output signal is transmitted through the first section.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 1 depicts a side view of an audio system in a vehicle in accordance with one embodiment;

FIG. 2 depicts a top view of audio system in the vehicle in accordance with one embodiment;

DETAILED DESCRIPTION

Figure 3:
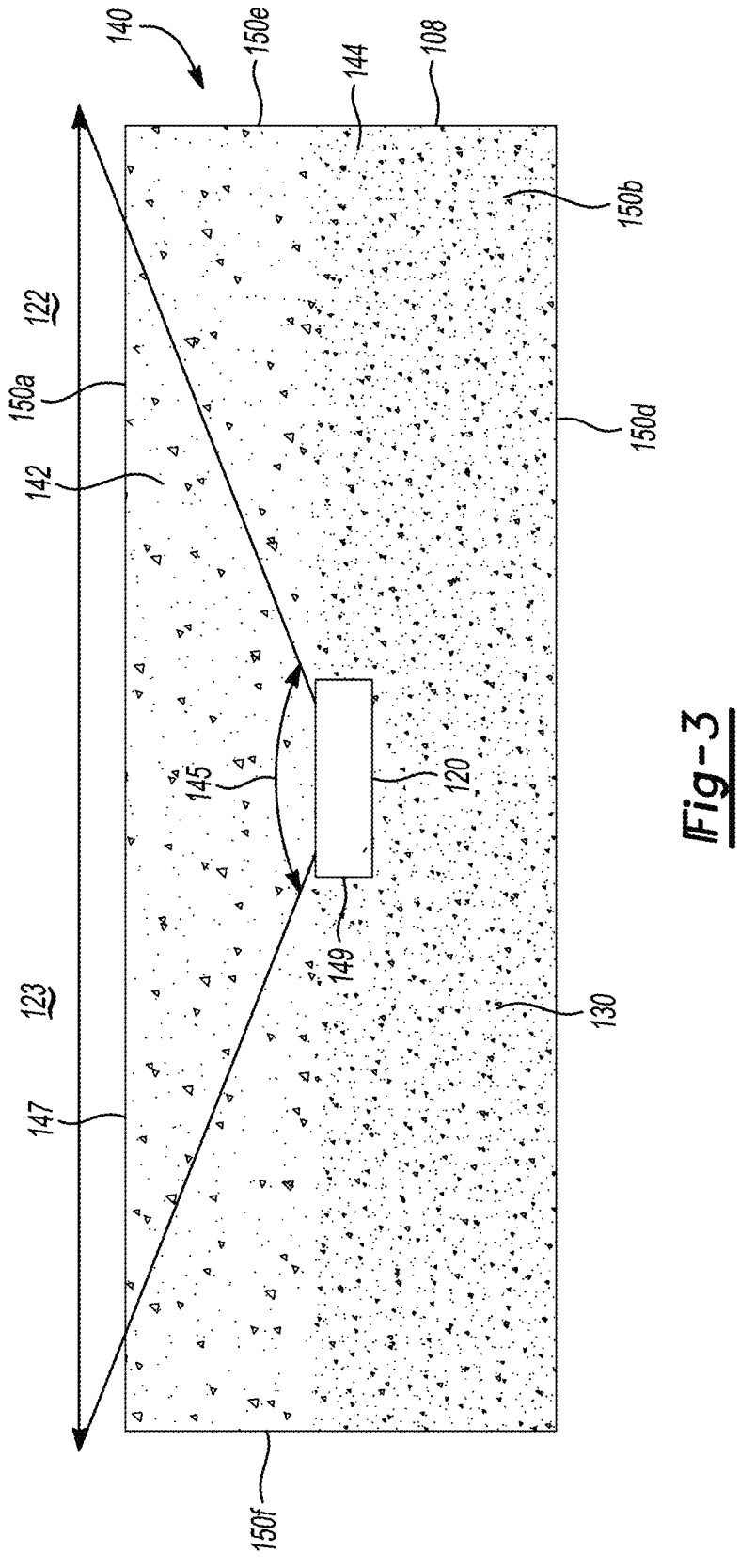
FIG. 3 depicts a cross section view of a vehicle headrest including a first loudspeaker in accordance with one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle headrests may include a substructure and one or more loudspeakers. The loudspeakers may be embedded within the substructure and a perforated foam is provided. The perforated foam may be positioned on top of the loudspeakers to provide comfort for the vehicle occupant. Since this foam is optimized for haptics but provides little in terms of audio performance, audio quality suffers. For example, the foam in this arrangement generally provides from an audio perspective, loss inefficiency and early roll-off frequency. Automotive Original Equipment Manufacturers (OEMs) have an interest in maximizing audio performance to increase the listening experience for vehicle occupants.

Aspects disclosed herein may utilize, for example, three dimensional (3D) printed structures (or lattice structures)

that provide optimal audio quality and acceptable haptics (i.e., comfort). In general, 3D printed lattice structures also provide opportunities to create a surface with a variable acoustical flow resistance. For example, the 3D printed lattice structures may be used to optimize acoustical performance by, for example, providing an optimized radiation pattern for one or more of the loudspeakers positioned within the headrest and by reducing audio leakage for one seat to another seat in the vehicle.

In one example, the lattice structures may be formed of a plurality of honeycomb lattice-based structures. It is recognized that that the lattice structure may take on any number of forms or shapes. For the lattice-based structures positioned in a front section of the headrest, such lattice structures may have a larger opening and thinner walls in comparison to the lattice structures positioned at top, bottom, lateral sides, and a rear of the headrest. Thus, in this regard, the larger openings of the various lattice-based structures enable greater audio transparency through the front of the headrest as the loudspeaker positioned in the headrest transmits an audio output signal. By arranging the lattice-based structures at the top, bottom, rear and side lateral sides of the headrest with smaller openings and larger walls, this may increase the density of the headrest which increases the rigidity of the lattice-based structures and further mitigates or reduces audio leakage from seat to seat. This aspect also provides more rigidity in the top, bottom, rear and lateral sides of the headrest which aids in either the fabric or leather wrapping operation with respect to the headrest.

For example, if the entire headrest was formed of the larger openings and thinner walls in the lattice structure as intended for the front of the headrest, this would not provide the required rigidity that is needed to hold the lattice structures in place as such structures are wrapped in either leather or fabric. In this case, the lack of rigidity of the lattice structures cause the lattice structures that form an inner core of the headrest to severely deform while undergoing the leather or fabric wrapping operation.

FIG. 1 depicts a side view of an audio arrangement (or system) 100 in a vehicle 102 in accordance with one embodiment. In general, the system 100 generally includes a vehicle seat 104 including a seat back (or backrest) 106 and a headrest 108. A support rod 110 is positioned between the seat back 106 and the headrest 108. The support rod 110 may be bi-directionally moveable about an axis 112 to enable occupant 114 the ability to position the headrest 108 relative to the occupant's head for comfort and support.

The headrest 108 includes one or more loudspeakers 120 (or the loudspeaker 120) positioned therein. The system 100 further includes an audio controller 121 positioned in the vehicle 102 that transmits audio input signals to the loudspeakers 120 positioned in the headrest 108. The loudspeakers 120 may transmit an audio output signal into a listening environment 122 (or cabin) of the vehicle 102. The loudspeaker 120 may transmit the audio signal toward a front 123 of the vehicle 102. It is recognized that any loudspeaker as disclosed herein and as positioned in the headrest 108 may transmit the audio output signal toward the front 123 of the vehicle 102. The headrest 108 includes a core (or substructure) 130 that provides safety functionality for the passenger on the seat 104 for purposes of crashworthiness. In one example, the core 130 may be formed of thermoplastic polyurethane (TPU).

In general, the core 130 may serve as an enclosure for the loudspeakers 120 as the loudspeakers 120 may be embedded within the core 130. The headrest 108 may include a lattice structure 140 that is formed from a three-dimensional (3D) printed machine. The lattice structure 140 is positioned in front and rear sections of the headrest 108. For example, the lattice structure 140 may surround the loudspeakers 120 and the core 103. The lattice structure 140 is configured to enable the audio output signal, as generated by the loudspeakers 120, to pass therethrough and into the listening environment 122 without degrading the quality of the audio output signal.

The lattice structure 140 generally includes a fibrous material (or foam-based material) that defines a plurality of openings to provide for increased audio transparency from the headrest 108. The lattice structure 140 generally includes a first section 142 and a second section 144 that are integrated with one another. The first section 142 of the lattice structure 140 may be less dense than the density of the second section 144. For example, the openings of the first section 142 may be larger than the openings of the second section to cause the first section 142 to be less dense than the second section 144. In addition, the material that forms the first section 142 and that defines the various openings may have thinner walls than that of the second section 144 causing the first section 142 to be less dense than the second section 144. These aspects will be discussed in more detail below.

In general, the headrest 108 may have a front side 150a, a top side 150b, a bottom side 150c, a rear side 150d, a first lateral side 150e, and a second lateral side 105f (see also FIG. 2). The top side 150b of the headrest 108 faces a top of the vehicle 102. The bottom side 150c of the headrest 108 faces a bottom of the vehicle 102. At least one of the first lateral side 150e and the second lateral side 150f face another seat positioned in the vehicle 102 that is situated in the same as the vehicle seat 104. The first section 142 of the lattice structure 140 is positioned on the front side 150a (e.g., in front of the loudspeakers 120) to enable increased audio transparency with respect to the loudspeakers 120 as the loudspeakers 120 transmit the audio output signal into the listening environment 122. In this regard, the first section 142 enables an entire face of the front side 150a to transmit the audio output signal to increase the transmission of the audio output signal to the occupant.

The second section 144 of the lattice structure 140 may be surrounded by the top side 150b, the bottom side 150c. the rear side 150d, the first lateral side 150e, and the second lateral side 150f of the headrest 108. In general, it may be desirable to provide more rigidity for portions of the headrest that are above, below and to the rear of the loudspeakers 120a and 120b to allow the headrest 108 to keep its shape and form while undergoing a leather wrapping or fabric wrapping operation. For example, if the headrest 108 was filled entirely with the first section 142 of the lattice structure 140, this condition may significantly compress the shape of the headrest 108 to the point where the headrest 108 may not retain its desired shape and form. Thus, the increased density provided by the second section 144 enables the headrest 108 to undergo the wrapping operation while maintaining the desired shape and form of the headrest while including the first section 142 of the lattice structure 140 within headrest 108.

FIG. 2 depicts a top view of the audio arrangement (or system 100) in the vehicle 102 in accordance with one embodiment. As shown, the headrest 108 includes a first loudspeaker 120a and a second loudspeaker 120b. lattice structure 140 generally includes the first section 142 and the second section 144. In general, the first section 142 may be a low flow resistance portion and the second section 144 may be a high flow resistance portion. The low flow resistance portion of the first section 142 generally enable the audio output signal to pass therethrough without adversely affect audio performance.

FIG. 3 depicts a cross section view of the vehicle headrest 108 including a single loudspeaker 120 in accordance with one embodiment. It is recognized that the headrest 108 may include any number of loudspeakers 120. The core 130 generally defines a cavity 149 (or opening). The loudspeaker 120 may be positioned in the cavity 149. The core 130 may serve as a loudspeaker enclosure for housing the loud-speaker 120. The first section 142 of the lattice structure 140. Thus, in this regard the audio transmitted by the loudspeaker 120 may have a larger dispersion angle 145 into the listening environment 122 of the vehicle 102.

Figures 4, 5:
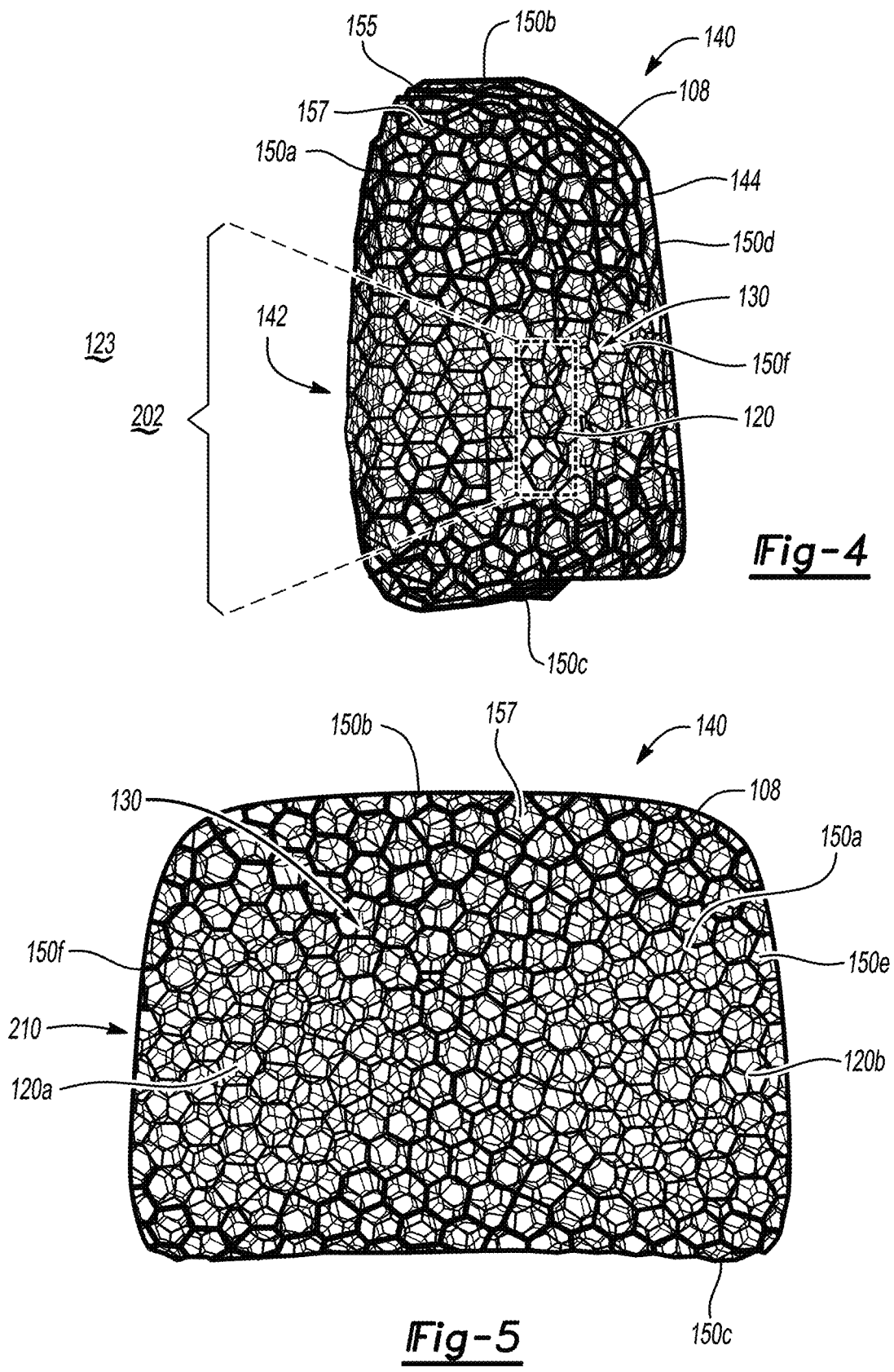
FIG. 4 depicts a side view of a vehicle headrest having a lattice structure in accordance with one embodiment.
FIG. 5 depicts a front view of the vehicle headrest having the lattice structure of FIG. 5 in accordance with one embodiment.

FIG. 4 depicts a side view of the vehicle headrest 108 having the lattice structure 140 in accordance with one embodiment. As noted above, the lattice structure 140 includes fibrous (or a foam based) material 155 that defines a plurality of openings 157. The lattice structure 150 gen-erally includes that the openings 157 are formed in honey-comb shapes. However, it is recognized that the openings 157 of the lattice structure 150 may take on any number of shapes. As shown, the lattice structure 140 encapsulates or completely surrounds the loudspeaker 120 and the core 130. A speaker cone of influence 202 is shown which is generally defined as an area of audio as projected or transmitted by the loudspeaker 120 directly from the loudspeaker 120 into the listening environment 122 and toward the front 123 of the vehicle 102.

The openings 157 that are formed in the first section 142 on the front side 150*a* may be larger than the openings 157 formed in the second section 144 on the top side 150*b*, the bottom side 150*c*, the rear side 150*d*, the first lateral side 150*e*, and the second lateral side 105*f*. Similarly, the material 155 that defines the openings 157 as positioned or formed in the first section 142 is thinner (e.g., smaller, reduced, less thickness, etc.) in comparison to the material 155 that defines the openings 157 in the second section 144 on the top side 150*b*, the bottom side 150*c*, the rear side 150*d*, the first lateral side 150*e*, and the second lateral side 105*f*. In general, the larger openings 157 and reduced size of the material 155 as formed in the first section 142 provides less density than that of the openings 157 and the increased size of the material 155 as formed on the second section 144.

The larger openings 157 on the front side 150*a* and reduced size (or thickness) of the material 155 enable the disclosed headrest 108 to provide a larger acoustic trans-parent footprint relative to conventional implementations. For example, the entire front side 150*a* of the headrest 108 may be configured to transmit the audio output signal from the loudspeakers 120. In addition, the reduced size of the openings 157 and increased size (or thickness) of the mate-rial 155 on the second section 144 prevent audio from being leaked to neighboring seats. Further, as noted above, the reduced size of the openings 157 and increased size (or thickness) of the material 155 on the second section 144 provide rigidity and prevent the headrest 108 from being significantly compressed during the leather or fabric opera-tion.

FIG. 5 depicts a front view of the vehicle headrest 108 having the lattice structure 140 of FIG. 4 in accordance with one embodiment. The vehicle headrest 108 of FIG. 5 depicts the first loudspeaker 120*a* and the second loudspeaker 120*b* embedded within the lattice structure 140. As noted above, the first section 142 includes the lower density (e.g., larger size of the openings 157 and smaller size of the material 155) which enables an increased acoustic transparency and decreased tunneling effect. Conversely, the second section 144 includes a higher density (e.g., smaller size of the openings 157 and increased size of the material 155) prevent audio from leaking into other zones (or seats) and provides rigidity that facilitates wrapping operations of the headrest 108.

Figure 6:
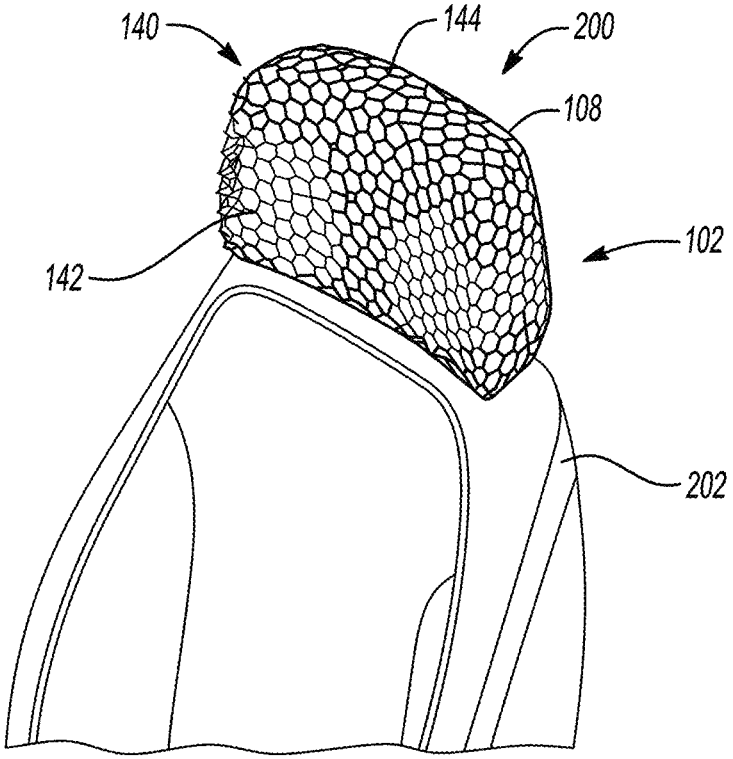
FIG. 6 depicts an elevated view of a vehicle seat assembly including the headrest of FIGS. 4-5 in accordance with one embodiment.

FIG. 6 depicts an elevated view of a vehicle seat assembly 200 including the headrest 108 of FIGS. 4-5 in accordance with one embodiment. The assembly 200 includes a seat back 202. The headrest 108 is coupled to the seat back 202 and includes the lattice structure 140 having the first section 142 and the second section 144. While not shown but understood in light of the present disclosure, one or more of the loudspeakers 120 may be positioned in the headrest 108 and that the aspects noted in connection with FIGS. 1-5 with respect to the lattice structure 140, the first section 142, and the second section 144 also apply to the headrest 108 as illustrated in FIG. 6.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodi-ments may be combined to form further embodiments of the invention.

What is claimed is:

1. A seat assembly comprising:
a seatback for a first seat and being configured to receive an occupant in a vehicle; and
a headrest coupled to the seatback, the headrest including:
at least one loudspeaker positioned therein and being configured to transmit an audio output signal from the headrest into a listening environment; and
a lattice structure including a first section positioned proximate to the at least one loudspeaker to enable the audio output signal to pass therethrough and a second section being proximate to the first section to prevent the audio output signal from leaking to a second seat,
wherein the first section of the lattice structure is formed at a first density,
wherein the second section of the lattice structure is formed at a second density, and
wherein the first density of the first section is less than the second density of the second section to increase an acoustic transparency of the audio output signal as the audio output signal is transmitted through the first section.

2. The seat assembly of claim 1, wherein the first section and the second section are integrated with one another.

3. The seat assembly of claim 1, wherein the first section of the lattice structure is positioned on a first side of the headrest that faces a front of the vehicle.

4. The seat assembly of claim 3, wherein the second section of the lattice structure is positioned on at least one of a second side of the headrest that faces a top of the vehicle, a third side of the headrest that faces a floor of the vehicle, and a fourth side of the vehicle that faces the second seat.

5. The seat assembly of claim 1 further comprising a core positioned in the headrest, wherein the at least one loud-speaker is positioned between the core and the first section of the lattice structure.

6. The seat assembly of claim 5, wherein the core defines an opening to receive the at least one loudspeaker such that the first section of the lattice structure covers the at least one loudspeaker, the opening, and the core.

7. The seat assembly of claim 1, wherein the first section includes a first fibrous material defining a first plurality of openings and the second section includes a second fibrous material defining a second plurality of openings.

8. The seat assembly of claim 7, wherein the first fibrous material is the same as the second fibrous material.

9. The seat assembly of claim 8, wherein the first plurality of openings are larger than the second plurality of openings to cause the first section to be less dense than the second section.

10. A seat assembly comprising:
   a first seat including:
      a seatback configured for receiving an occupant in a vehicle; and
      a headrest coupled to the seatback, the headrest including:
         at least one loudspeaker positioned therein and being configured to transmit an audio output signal from the headrest into a listening environment;
         a lattice structure including a first section positioned proximate to the at least one loudspeaker to enable the audio output signal to pass therethrough and a second section being proximate to the first section to prevent the audio output signal from leaking from the first seat to a second seat,
      wherein the first section of the lattice structure defines a first plurality of openings,
      wherein the second section of the lattice structure defines a second plurality of openings, and
      wherein the first plurality of openings is larger than the second plurality of openings to increase an acoustic transparency of the audio output signal as the audio output signal is transmitted through the first section of the lattice structure.

11. The seat assembly of claim 10, wherein the first section and the second section are integrated with one another.

12. The seat assembly of claim 11, wherein the first section of the lattice structure includes a first fibrous material that defines the first plurality of openings, and the second section includes a second fibrous material that defines the second plurality of openings, wherein the first fibrous material and the second fibrous material are the same.

13. The seat assembly of claim 10, wherein the first section of the lattice structure is positioned on a first side of the headrest that faces a front of the vehicle.

14. The seat assembly of claim 13, wherein the second section of the lattice structure is positioned on at least one of a second side of the headrest that faces a top of the vehicle, a third side of the headrest that faces a floor of the vehicle, and a fourth side of the vehicle that faces the second seat.

15. The seat assembly of claim 10 further comprising a core positioned in the headrest, wherein the at least one loudspeaker is positioned between the core and the first section of the lattice structure.

16. The seat assembly of claim 15, wherein the core defines an opening to receive the at least one loudspeaker such that the first section of the lattice structure covers the at least one loudspeaker, the opening, and the core.

17. An apparatus comprising:
   a headrest for being coupled to a first seat to receive an occupant in a vehicle, the headrest including:
      at least one loudspeaker positioned therein and being configured to transmit an audio output signal from the headrest into a listening environment of the vehicle; and
      a lattice structure including a first section positioned on a first side of the headrest that is orientated toward a front of the vehicle to enable the audio output signal to pass therethrough and a second section being positioned proximate to the first section to prevent the audio output signal from leaking to a second seat,
      wherein the first section of the lattice structure is formed at a first density,
      wherein the second section of the lattice structure is formed at a second density, and
      wherein the first density of the first section is less than the second density of the second section to increase an acoustic transparency of the audio output signal as the audio output signal is transmitted through the first section.

18. The apparatus of claim 17, wherein the first section and the second section are integrated with one another.

19. The apparatus of claim 18, wherein the second section of the lattice structure is positioned on at least one of a second side of the headrest that faces a top of the vehicle, a third side of the headrest that faces a floor of the vehicle, and a fourth side of the vehicle that faces the second seat.

20. The apparatus of claim 17 further comprising a core positioned in the headrest, wherein the at least one loudspeaker is positioned between the core and the first section of the lattice structure.

* * * * *